(12) United States Patent
Koizumi et al.

(10) Patent No.: US 8,610,828 B2
(45) Date of Patent: Dec. 17, 2013

(54) MOVING PICTURE REPRODUCTION AND DISPLAY FREQUENCY CHANGE, AN APPARATUS, METHOD, AND PROGRAM

(75) Inventors: Naoshi Koizumi, Tokyo (JP); Fukukyo Sudo, Tokyo (JP); Daisuke Kurosaki, Tokyo (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 12/535,260

(22) Filed: Aug. 4, 2009

(65) Prior Publication Data
US 2010/0054697 A1 Mar. 4, 2010

(30) Foreign Application Priority Data
Aug. 29, 2008 (JP) ................................. 2008-221854

(51) Int. Cl.
*H04N 3/27* (2006.01)

(52) U.S. Cl.
USPC ........... 348/554; 715/205; 386/124; 386/201; 386/232; 386/279; 386/343; 386/344; 386/345; 386/346; 386/347; 386/348; 386/349; 386/350; 386/351; 386/352; 345/473; 345/474; 345/475; 725/81; 725/116; 725/131; 725/146; 348/613; 370/230; 370/428

(58) Field of Classification Search
None
See application file for complete search history.

(56) References Cited

U.S. PATENT DOCUMENTS

| | | | |
|---|---|---|---|
| 7,043,019 B2 * | 5/2006 | Tehranchi et al. | 380/218 |
| 7,206,811 B2 * | 4/2007 | Skurikhin et al. | 709/205 |
| 7,221,759 B2 * | 5/2007 | Nelson | 380/54 |
| 7,634,134 B1 * | 12/2009 | So | 382/173 |
| 7,639,706 B2 * | 12/2009 | Hamada et al. | 370/428 |
| 2002/0030635 A1 * | 3/2002 | McGowan | 345/5 |
| 2005/0220130 A1 * | 10/2005 | Hamada et al. | 370/428 |
| 2007/0091204 A1 * | 4/2007 | Koshimizu et al. | 348/441 |
| 2007/0236603 A1 * | 10/2007 | Itoh et al. | 348/441 |
| 2008/0107405 A1 * | 5/2008 | Chen et al. | 386/124 |
| 2009/0004948 A1 * | 1/2009 | Ando et al. | 446/431 |
| 2010/0142912 A1 * | 6/2010 | So | 386/2 |
| 2010/0149413 A1 * | 6/2010 | Kumakawa | 348/447 |

FOREIGN PATENT DOCUMENTS

JP 2000-32376 1/2000

* cited by examiner

*Primary Examiner* — Nasser Goodarzi
*Assistant Examiner* — Paul Graham
(74) *Attorney, Agent, or Firm* — Oblon, Spivak, McClelland, Maier & Neustadt, L.L.P.

(57) ABSTRACT

The present invention provides a moving picture reproduction apparatus including a frequency change unit for changing a display frequency to a frequency of a moving picture when a reproduction of the moving picture starts and for changing the display frequency to a frequency prior to the start of the reproduction of the moving picture when the reproduction of the moving picture stops, and a reproduction unit for stopping the reproduction of the moving picture when the frequency change unit changes the display frequency, wherein the frequency change unit maintains the display frequency at the frequency of the moving picture in a case where the reproduction unit stops the reproduction of the moving picture in response to the change of the display frequency by the frequency change unit.

6 Claims, 7 Drawing Sheets

MOVING PICTURE REPRODUCTION AND DISPLAY FREQUENCY CHANGE, AN APPARATUS, METHOD, AND PROGRAM

BACKGROUND OF THE INVENTION

1. Field of the Invention

The present invention relates to a moving picture reproduction apparatus, a moving picture reproduction method, and a program. More particularly, the present invention relates to a moving picture reproduction apparatus, a moving picture reproduction method, and a program that reproduce a moving picture by using a reproduction application that temporarily stops reproduction of the moving picture in accordance with the change in the frequency of a display.

2. Description of the Related Art

In related art, recorders have been used to record and reproduce television broadcasts and the like. Since the subcarrier frequency of the color television method differs depending on the destination area, the constituent parts and circuits of the recorder need to be manufactured for each method. Taking these facts into account, Japanese Patent Application Laid-Open No. 2000-32376 discloses a technique for changing the used frequency in accordance with the destination area in response to a simple operation performed by a user.

SUMMARY OF THE INVENTION

In recent years, as the personal computers (hereinafter referred to as PCs) spread widely, users who view moving pictures using the PCs instead of the television receivers and dedicated recorders in related art are increasing. Accordingly, the frequency of the display is changed in accordance with the frequency of the moving picture in order to smoothly reproduce the moving picture using the PC. On the other hand, when any moving picture is not reproduced, for example, when the desktop is displayed or text information is displayed, the display is desirably driven at the maximum frequency that can be set, for example, at 59.94 Hz, in order to prevent flickering.

When the frequency of the display is changed during the reproduction of the moving picture, some reproduction applications instruct to stop reproduction of the moving picture. When the moving picture is thus reproduced by the reproduction applications thus configured, the frequency of the display is changed to the frequency prior to the reproduction of the moving picture, for example, 59.94 Hz, when the frequency of the display is changed and the stop of the reproduction is detected.

As described above, there exists an issue that, if the frequency of the display is changed during the reproduction of the moving picture when the moving picture is reproduced using the reproduction application that instructs to stop reproduction of the moving picture, the following operations are repeated: the moving picture stops when the frequency is changed to match the frequency of the moving picture; and the frequency prior to the reproduction of the moving picture is changed when the moving picture stops.

The present invention addresses the above-described issue and other issues associated with conventional methods and apparatuses. Accordingly, the present invention provides a novel and improved moving picture reproduction apparatus, a moving picture reproduction method, and a program that can normally reproduce a moving picture using a reproduction application that instructs to stop the reproduction of the moving picture when the frequency of the display is changed during the reproduction of the moving picture.

According to an embodiment of the present invention, there is provided a moving picture reproduction apparatus including: a frequency change unit for changing a display frequency to a frequency of a moving picture when a reproduction of the moving picture starts and for changing the display frequency to a frequency prior to the start of the reproduction of the moving picture when the reproduction of the moving picture stops; and a reproduction unit for stopping the reproduction of the moving picture when the frequency change unit changes the display frequency, wherein the frequency change unit maintains the display frequency at the frequency of the moving picture in a case where the reproduction unit stops the reproduction of the moving picture in response to the change of the display frequency by the frequency change unit.

With such configuration, the reproduction of the moving picture stops when the display frequency is changed, and the display frequency is maintained at the frequency of the moving picture when the reproduction of the moving picture stops in response to the change of the display frequency.

Therefore, the moving picture can be normally reproduced using the reproduction application that instructs to stop the reproduction of the moving picture when the frequency of the display is changed during the reproduction of the moving picture. Namely, when the moving picture is reproduced using the reproduction application that instructs to stop reproduction of the moving picture, the repetition of the following operations can be avoided: the moving picture stops when the frequency is changed to match the frequency of the moving picture; and the frequency prior to the reproduction of the moving picture is changed when the moving picture stops.

Further, the frequency change unit may maintain the display frequency at the frequency of the moving picture in a case where the reproduction unit starts the reproduction of the moving picture after a predetermined period of time passes since the reproduction unit stops the reproduction of the moving picture.

The frequency change unit may maintain the display frequency at the frequency of the moving picture in a case where the reproduction unit stops the reproduction of the moving picture after a predetermined period of time passes since the frequency change unit changes the display frequency to the frequency of the moving picture.

The reproduction unit may stop the reproduction of the moving picture when the display frequency is changed during the reproduction of the moving picture.

According to another embodiment of the present invention, there is provided a moving picture reproduction method including the steps of: stopping a reproduction of a moving picture when a display frequency is changed; determining whether the reproduction of the moving picture stops in response to a change of the display frequency; and maintaining the display frequency at a frequency of the moving picture in a case where the reproduction of the moving picture stops in response to the change of the display frequency.

According to another embodiment of the present invention, there is provided a program for causing a computer to function as a moving picture reproduction apparatus, wherein the moving picture reproduction apparatus includes: a frequency change unit for changing a display frequency to a frequency of a moving picture when a reproduction of the moving picture starts and for changing the display frequency to a frequency prior to the start of the reproduction of the moving picture when the reproduction of the moving picture stops; and a reproduction unit for stopping the reproduction of the moving picture when the frequency change unit changes the display frequency, and the frequency change unit maintains the display frequency at the frequency of the moving picture in a case where the reproduction unit stops the reproduction of the moving picture in response to the change of the display frequency by the frequency change unit.

Such program can cause hardware resources of a computer, such as CPU, ROM, or RAM, to execute the function of each element of the moving picture reproduction apparatus as described above.

According to the embodiments of the present invention described above, the moving picture can be normally reproduced using the moving picture reproduction application.

DETAILED DESCRIPTION OF THE PREFERRED EMBODIMENTS

Figure 1:
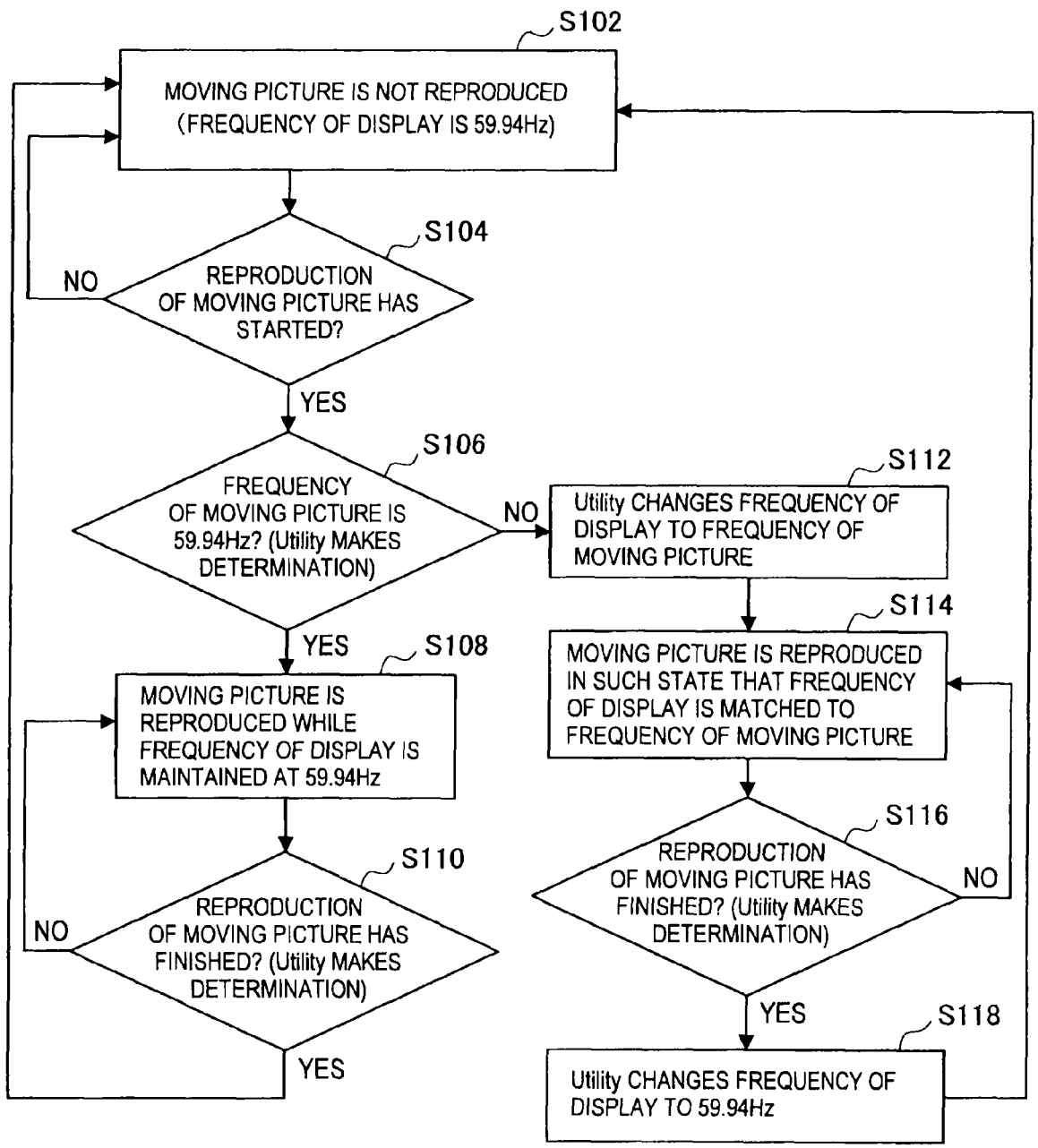
FIG. 1 is an explanatory diagram illustrating the change of the frequency of a generally-used display.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, "DETAILED DESCRIPTION OF THE PREFERRED EMBODIMENTS" will be described in accordance with the order listed below.
[1] The object of the present embodiment
[2] The hardware configuration of the moving picture reproduction apparatus
[3] The functional configuration of the moving picture reproduction apparatus
[4] The flow of data in the moving picture reproduction apparatus
[5] Operation of the moving picture reproduction apparatus
[1] The Object of the Present Embodiment First, the object of the embodiment of the present invention will be described. In recent years, as the PCs spread widely, users who view moving pictures using the PCs instead of the television receivers and dedicated recorders in related art are increasing. In such circumstances, the frequency of the display is changed in accordance with the frequency of the moving picture in order to smoothly reproduce the moving picture using the PC.

On the other hand, when any moving picture is not reproduced, for example, when the desktop is displayed or text information is displayed, the display is desirably driven at the maximum frequency that can be set, for example, at 59.94 Hz, in order to prevent flickering.

FIG. 1 is an explanatory diagram illustrating the processing flow of the change of the frequency of a generally-used display. As illustrated in FIG. 1, the frequency of the display is usually set to 59.94 Hz when the moving picture is not reproduced, namely, when the desktop is displayed or text information is displayed (S102). When the reproduction of the moving picture is determined to have started (S104), a utility makes a determination as to whether the frequency of the moving picture is equal to the frequency prior to the reproduction of the moving picture, 59.94 Hz (S106).

In a case where the frequency of the moving picture is determined to be 59.94 Hz in step S106, the moving picture is reproduced with the frequency of the display being maintained at 59.94 Hz (S108). Thereafter, the utility makes a determination as to whether the reproduction of the moving picture has finished (S110). In a case where the reproduction of the moving picture is determined not to have finished yet in step S110, the reproduction of the moving picture continues. On the other hand, in a case where the reproduction of the moving picture is determined to have finished in step S110, the moving picture reproduction apparatus goes into such a state that the moving picture is not reproduced (S102).

On the other hand, in a case where the frequency of the moving picture is determined not to be 59.94 Hz in step S106, the utility changes the frequency of the display to the frequency of the moving picture (S112). Accordingly, the moving picture is reproduced with the frequency of the display being matched to the frequency of the moving picture (S114).

Thereafter, the utility makes a determination as to whether the reproduction of the moving picture has finished (S116). In a case where the reproduction of the moving picture is determined not to have finished yet in step S116, the moving picture is continuously reproduced in such a state that the frequency of the display is matched to the frequency of the moving picture (S114). On the other hand, in a case where the reproduction of the moving picture is determined to have finished in step S116, the utility changes the frequency of the display to the frequency prior to the reproduction of the moving picture, 59.94 Hz (S118).

There exists reproduction applications, such as Media Center and WinDVD, that instruct to stop the reproduction of the moving picture when the frequency of the display is changed during the reproduction of the moving picture. In a case where such reproduction applications reproduce the moving pictures, the frequency of the display is changed to the frequency prior to the reproduction of the moving picture, for example, 59.94 Hz, when the frequency of the display is changed and the stop of the reproduction is detected.

As described above, there exists an issue that, if the frequency of the display is changed during the reproduction of the moving picture, when the moving picture is reproduced using the reproduction application that instructs to stop reproduction of the moving picture, the following operations are repeated: the moving picture stops when the frequency is changed to match the frequency of the moving picture; and the frequency prior to the reproduction of the moving picture is changed when the moving picture stops.

Figure 2:
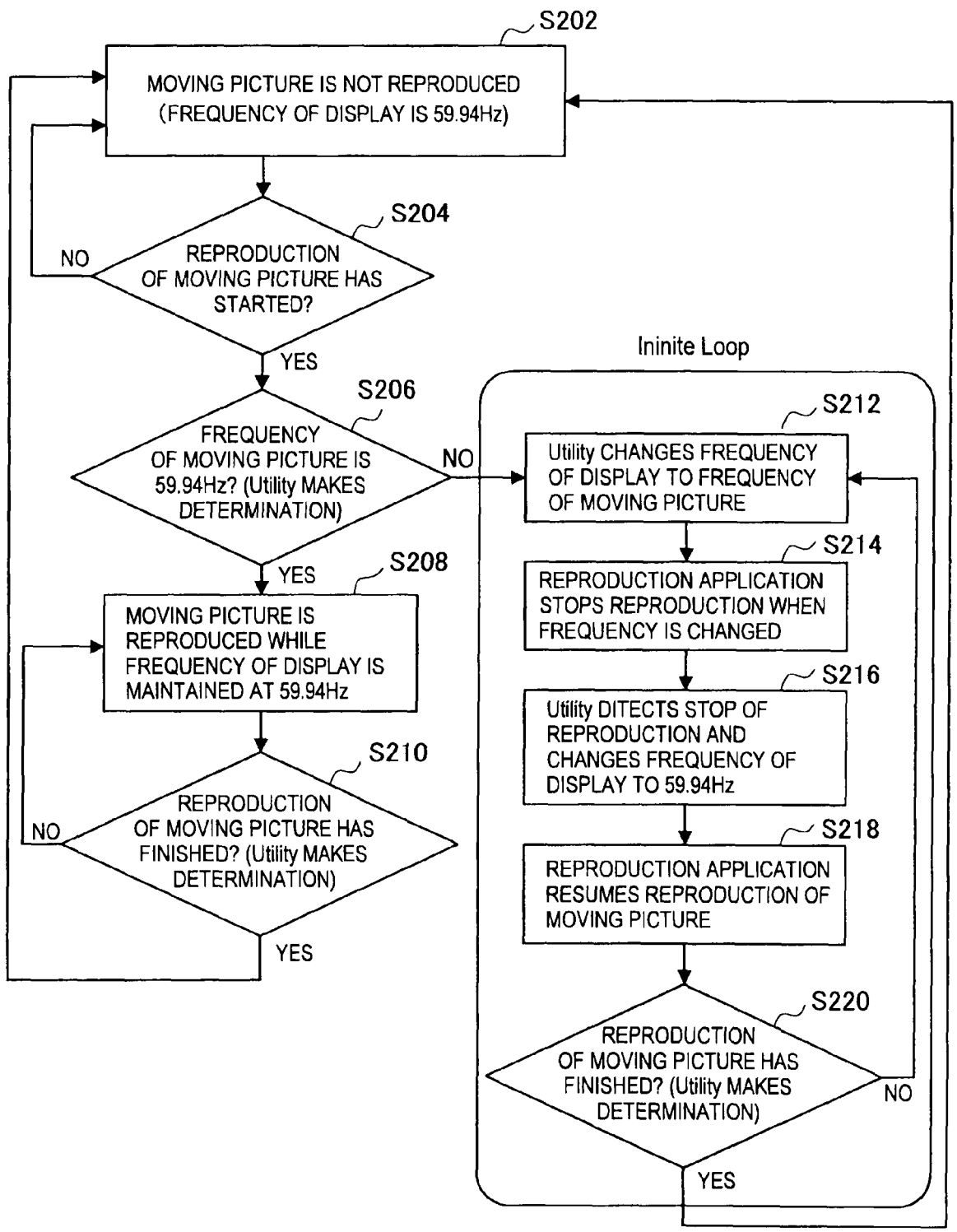
FIG. 2 is an explanatory diagram illustrating the flow of processings in a case where the moving picture is reproduced using the reproduction application.

FIG. 2 is an explanatory diagram illustrating the flow of processings in a case where the moving picture is reproduced using the reproduction application (hereinafter simply referred to as the reproduction application) that instructs to stop the reproduction of the moving picture when the frequency of the display is changed during the reproduction of the moving picture. As illustrated in FIG. 2, when any moving picture is not reproduced, namely, when the desktop is displayed or text information is displayed, the frequency of the display is set to 59.94 Hz (S202). Then, when the reproduction of the moving picture is determined to have started (S204), the utility makes a determination as to whether the frequency of the moving picture is equal to the frequency prior to the reproduction of the moving picture, 59.94 Hz (S206).

In a case where the frequency of the moving picture is determined to be 59.94 Hz in step S206, the moving picture is reproduced with the frequency of the display being maintained at 59.94 Hz (S208). Thereafter, the utility makes a determination as to whether the reproduction of the moving picture has finished (S210). In a case where the reproduction of the moving picture is determined not to have finished yet in step S210, the moving picture is continuously reproduced. On the other hand, in a case where the reproduction of the moving picture is determined to have finished in step S210, the moving picture reproduction apparatus goes into such a state that the moving picture is not reproduced (S202).

On the other hand, in a case where the frequency of the moving picture is determined not to be 59.94 Hz in step S206, the utility changes the frequency of the display to the frequency of the moving picture (S212). When the frequency of the display is changed in step S212, the reproduction application instructs to stop the reproduction, so that the reproduction of the moving picture stops (S214).

When the reproduction of the moving picture stops in step S214, the utility detects the stop of the reproduction of the moving picture, and changes the frequency of the display to the frequency prior to the reproduction of the moving picture, 59.94 Hz (S216). Thereafter, the reproduction application resumes the reproduction of the moving picture (S218).

Thereafter, the utility makes a determination as to whether the reproduction of the moving picture has finished (S220). In a case where the reproduction of the moving picture is determined not to have finished in step S220, the utility changes the frequency of the display to the frequency of the moving picture (S212). In a case where the reproduction of the moving picture is determined to have finished in step S220, the utility changes the frequency of the display to the frequency prior to the reproduction of the moving picture, 59.94 Hz (S118).

In a case where the moving picture whose frequency is not 59.94 Hz is reproduced in this way, the processings from step S212 to step S220 are repeated, so that an infinite loop is formed. In this case, the display repeats black out as the moving picture is reproduced and stopped. A moving picture reproduction apparatus 100 according to an embodiment of the present invention has been created in view of the above-described circumstances. With the moving picture reproduction apparatus 100 according to the present embodiment, the moving picture can be normally reproduced using the reproduction application that instructs to stop the reproduction of the moving picture when the frequency of the display is changed during the reproduction of the moving picture.

Figure 3:
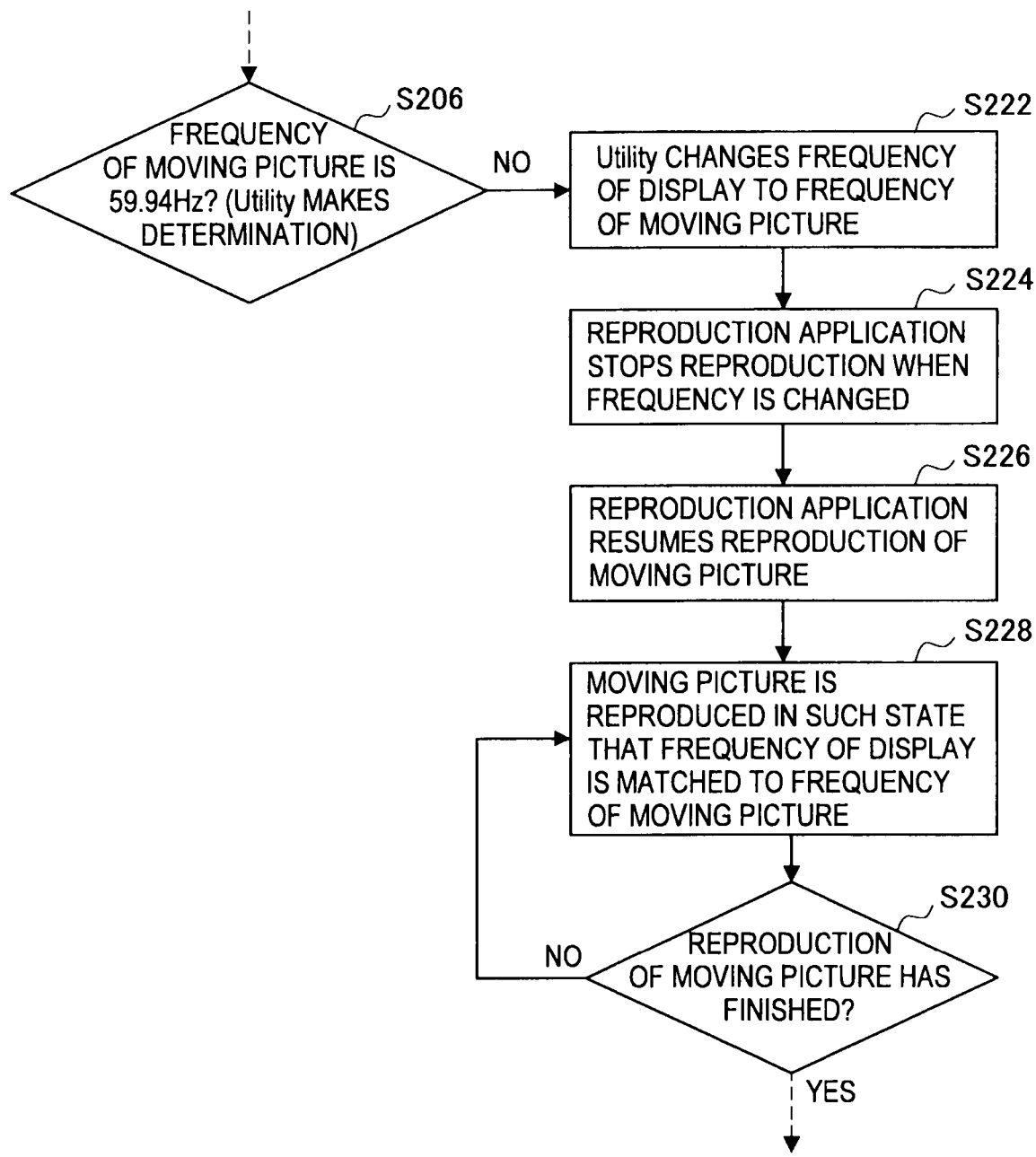
FIG. 3 is an explanatory diagram illustrating the overview of the reproduction of the moving picture according to the present embodiment.

FIG. 3 is an explanatory diagram illustrating the overview of the moving picture reproduction processings in which the above-described issues are solved. As illustrated in FIG. 3, in a case where the frequency of the moving picture is determined not to be 59.94 Hz in step S206, the utility changes the frequency of the display to the frequency of the moving picture (S222). When the frequency of the display is changed in step S222, the reproduction application instructs to stop the reproduction, so that the reproduction of the moving picture stops (S224).

Thereafter, the reproduction application resumes the reproduction of the moving picture without the frequency of the display being changed by the utility (S226). Then, the moving picture is reproduced in such a state that the frequency of the display is matched to the frequency of the moving picture (S228). Thereafter, the utility makes a determination as to whether the reproduction of the moving picture has finished (S230). In a case where the reproduction of the moving picture is determined not to have finished yet in step S230, the moving picture is continuously reproduced in such a state that the frequency of the display is matched to the frequency of the moving picture (S228).

As described above, the moving picture reproduction apparatus 100 according to the present embodiment does not change but maintains the frequency of the display when the reproduction application temporarily stops upon detecting the change of the frequency. Therefore, the moving picture can be reproduced while the infinite loop as illustrated in FIG. 2 is avoided. Hereinafter, described in detail is the moving picture reproduction apparatus 100 that does not change but maintains the frequency of the display when the reproduction application detects the change of the frequency and the reproduction performed by the application temporarily stops.

In the present embodiment, the moving picture reproduction apparatus 100 is formed integrally with a display device such as an LCD and the like, but the present embodiment is not limited thereto. For example, the moving picture reproduction apparatus may be formed independently from the display device. Examples of the moving picture reproduction apparatus 100 include a personal computer (hereinafter referred to as PC) or the like. Especially, the present embodiment will be hereinafter described using an example of a so-called notebook PC in which a PC main body portion including a processing device and a recording device is integrally formed with the display device.

[2] The Hardware Configuration of the Moving Picture Reproduction Apparatus

Figure 4:
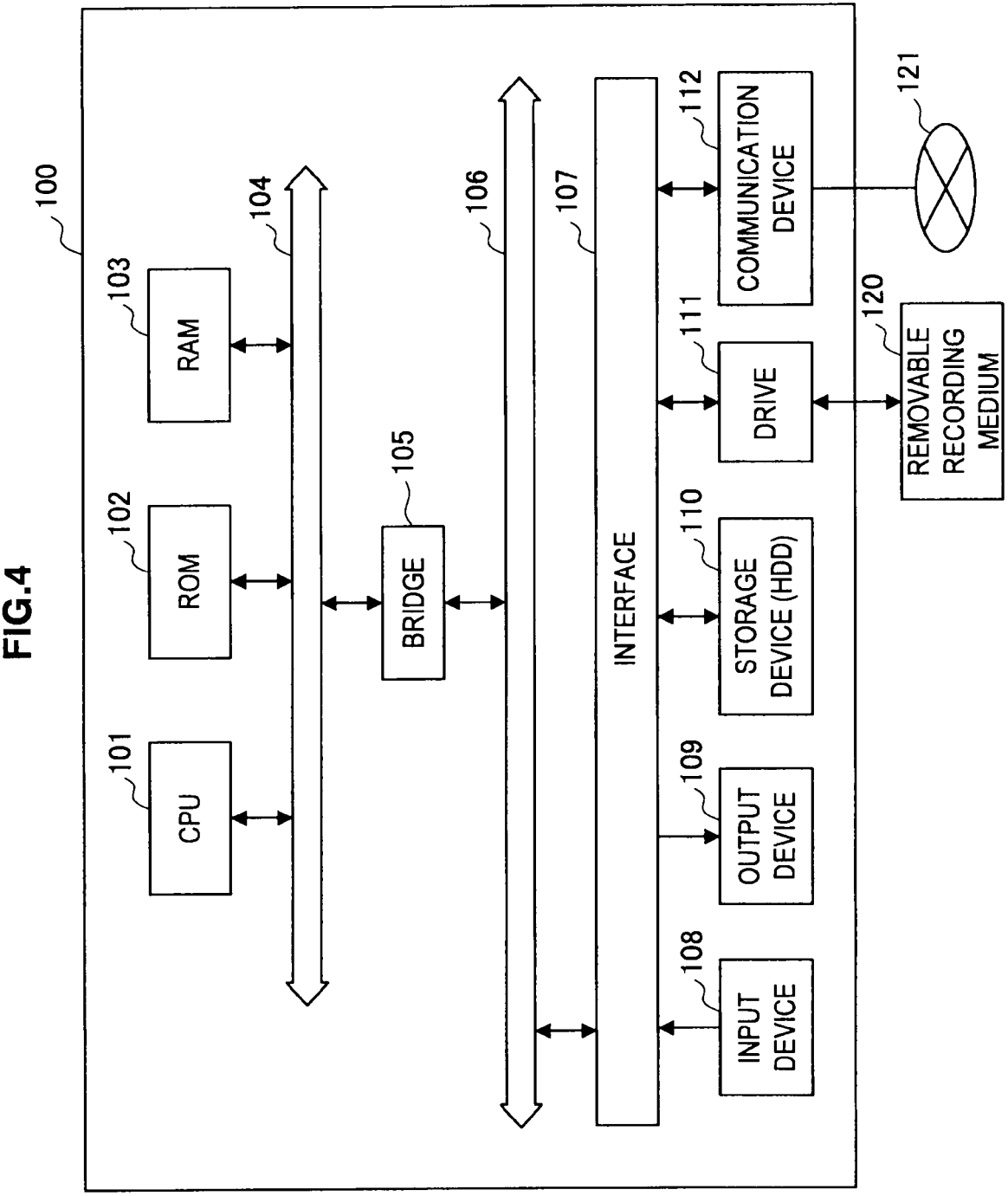
FIG. 4 is a block diagram illustrating the hardware configuration of a moving picture reproduction apparatus according to the present embodiment.

Next, the hardware configuration of the moving picture reproduction apparatus 100 according to the present embodiment will be described based on FIG. 4. FIG. 4 is a block diagram illustrating the hardware configuration of the moving picture reproduction apparatus 100 according to the present embodiment.

FIG. 4 is an explanatory diagram illustrating the hardware configuration of the moving picture reproduction apparatus 100 according to the present embodiment. The moving picture reproduction apparatus 100 has a CPU (Central Processing Unit) 101, a ROM (Read Only Memory) 102, a RAM (Random Access Memory) 103, a host bus 104, a bridge 105, an external bus 106, an interface 107, an input device 108, an output unit 109, a storage device (HDD) 110, a drive 111, and a communication device 112.

The CPU 101 functions as a calculation processing device and a control device, and controls the overall operation in the moving picture reproduction apparatus 100 according to various programs. The CPU 101 may be a microprocessor. The ROM 102 stores programs, operation parameters, and the like used by the CPU 101. The RAM 103 primarily stores the programs used during the execution of the CPU 101 and the parameters and the like that change, as appropriately, during the execution. These are connected with each other via the host bus 104 configured with a CPU bus and the like.

The host bus 104 is connected to the external bus 106 such as PCI (Peripheral Component Interconnect/Interface) via the bridge 105. The host bus 104, the bridge 105, and the external bus 106 are not necessarily formed separately, and these functions may be implemented on one bus.

The input device 108 includes input means, such as a mouse, a keyboard, a touch panel, buttons, a microphone, switches, and levers, which allows a user to input information, and also includes an input control circuit which generates an input signal based on the input of the user and outputs the input signal to the CPU 101. By operating the input device 108, the users of the moving picture reproduction apparatus 100 can input various data and instruct processing operation to the moving picture reproduction apparatus 100.

The output device 109 includes a display device such as a CRT (Cathode Ray Tube) display device, a liquid crystal display (LCD) device, an OLED (Organic Light Emitting Display) device, and lamps, and also includes an audio output device such as a speaker and a headphone. The output device 109 outputs, for example, a reproduced content. Specifically, the display device displays, as text or image, various information such as reproduced video data and the like. On the other hand, the audio output device converts the reproduced audio data and the like into audio and outputs the audio.

The storage device 110 is a data storage device as an example of a storage unit for the moving picture reproduction apparatus 100 according to the present embodiment. The storage device 110 may include a storage medium, a recording device for recording data on the storage medium, a reading device for reading data from the storage medium, and a deleting device for deleting data recorded on the storage medium. The storage device 110 is configured with, for example, an HDD (Hard Disk Drive). This storage device 110 drives a hard disk and stores various data and programs executed by the CPU 101. The storage device 110 is recorded with content data, metadata, device data, and the like.

The drive 111 is a reader/writer for the storage medium, and is built in the moving picture reproduction apparatus 100 or attached externally to the moving picture reproduction apparatus 100. The drive 111 reads information recorded on a removable storage medium 120 such as a mounted magnetic disk, an optical disk, a magneto-optical disk, or a semiconductor memory, and outputs the information to the RAM 103.

The communication device 112 is a communication interface configured with, for example, a communication device and the like for connecting to a communication network 121. The communication device 112 may be a communication device compatible with wireless LAN (Local Area Network), a communication device compatible with wireless USB, and a wired communication device capable of communicating via wire. The communication device 112 sends and receives various data such as content data and content lists via the communication network 121 to and from external devices.

[3] The Functional Configuration of the Moving Picture Reproduction Apparatus

The hardware configuration of the moving picture reproduction apparatus 100 according to the present embodiment has been hereinabove described with reference to FIG. 4. Next, the functional configuration of the moving picture reproduction apparatus 100 according to the present embodiment will be described with reference to FIG. 5.

Figure 5:
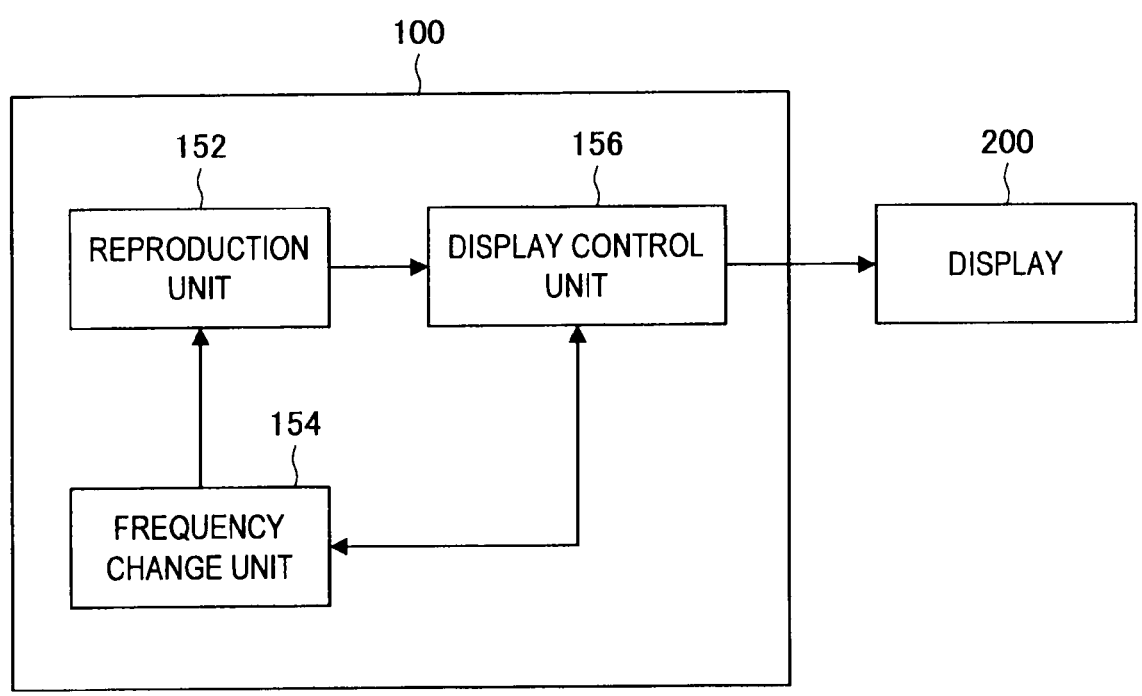
FIG. 5 is a block diagram illustrating the functional configuration of the moving picture reproduction apparatus according to the present embodiment.

FIG. 5 is a block diagram illustrating the functional configuration of the moving picture reproduction apparatus 100 according to the present embodiment. As illustrated in FIG. 5, the moving picture reproduction apparatus 100 according to the present embodiment has a reproduction unit 152, a frequency change unit 154, a display control unit 156, and the like.

The reproduction unit 152 has a function to stop the reproduction of the moving picture in response to the change of the display frequency by the later-described frequency change unit 154. Especially, the reproduction unit 152 stops the reproduction of the moving picture in response to the change of the display frequency during the reproduction of the moving picture.

The frequency change unit 154 has a function to change the display frequency to the frequency of the moving picture when the reproduction of the moving picture starts, and also has a function to change the display frequency to the frequency prior to the start of the reproduction of the moving picture when the reproduction of the moving picture stops. Further, the frequency change unit 154 has a function to maintain the display frequency at the frequency of the moving picture when the reproduction of the moving picture performed by the reproduction unit 152 stops in response to the change of the display frequency by the frequency change unit 154.

The following are examples of cases where the reproduction of the moving picture performed by the reproduction unit 152 stops in response to the change of the display frequency by the frequency change unit 1 54. For example, the reproduction of the moving picture can be determined to have stopped in response to the change of the display frequency if the reproduction of the moving picture is started by the reproduction unit 152 after a predetermined period of time passes since the reproduction of the moving picture is stopped by the reproduction unit 152. Further, the reproduction of the moving picture can be determined to have stopped in response to the change of the display frequency if the reproduction of the moving picture is stopped by the reproduction unit 152 after the predetermined period of time passes since the display frequency is changed to the frequency of the moving picture by the frequency change unit 154.

"After the predetermined period of time passes" described above may be defined as, for example, after approximately 5 seconds to 1 minute passes. This is the time needed for the frequency change unit 154 to change the frequency of the display to the frequency of the moving picture. Therefore, in a case where the reproduction of the moving picture starts after approximately 5 seconds to 1 minute passes since the reproduction of the moving picture stops, the display frequency is not changed to the frequency prior to the start of reproduction of the moving picture, but is maintained at the frequency of the moving picture. In a case where the reproduction of the moving picture stops after approximately 5 seconds to 1 minute passes since the display frequency is changed to the frequency of the moving picture, the display frequency is not changed to the frequency prior to the start of the reproduction of the moving picture, but is maintained at the frequency of the moving picture.

The display control unit 156 has a function to control the reproduction of the moving picture on a display 200 in accordance with the instruction of the reproduction unit 152. Further, the display control unit 156 notifies the frequency change unit 154 of the frequency of the display 200 and the moving picture reproduced on the display 200. The display control unit 156 also has a function to change the frequency of the display 200 in accordance with the instruction of the frequency change unit 154.

[4] The Flow of Data in the Moving Picture Reproduction Apparatus

Figure 6:
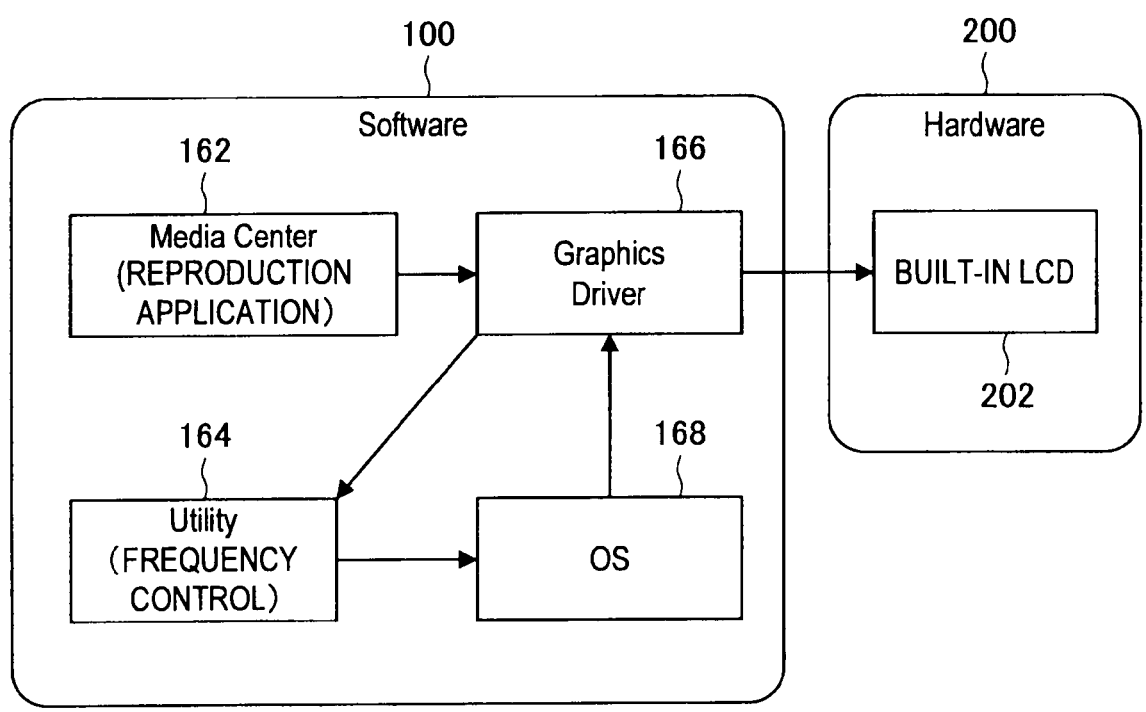
FIG. 6 is an explanatory diagram illustrating the flow of data in the moving picture reproduction apparatus according to the present embodiment.

The functional configuration of the moving picture reproduction apparatus 100 has been hereinabove described. Next, the flow of data in the moving picture reproduction apparatus 100 will be described with reference to FIG. 6. FIG. 6 is an explanatory diagram illustrating the flow of data in the moving picture reproduction apparatus 100.

As shown in FIG. 6, examples of software running on the moving picture reproduction apparatus 100 include Media Center (hereinafter referred to as reproduction application) 162, a utility (hereinafter referred to as frequency control utility) 164, a graphics driver (hereinafter referred to as driver) 166, and an OS 168.

Herein, the reproduction application 162 is one example of the reproduction unit 152 according to the present embodiment. The frequency control utility 164 is one example of the frequency change unit 154 according to the present embodiment. The driver 166 is one example of the display control unit 156.

First, the reproduction application 162 starts the reproduction of the moving picture, and transmits to the driver 166 the moving picture to be reproduced. Then, the frequency of the moving picture is notified to the frequency control utility 164 via the driver 166.

In a case where the frequency of the moving picture is different from the frequency of the built-in LCD of the display (hardware) 200, the frequency control utility 164 requests the driver 166 to change the frequency by way of the OS 168.

The driver 166 changes the frequency of the built-in LCD 202 to the frequency requested by way of the OS 168. The reproduction application 162 detects the change of the frequency of the built-in LCD 202 made by the driver 166. Upon detecting the change of the frequency of the built-in LCD 202, the reproduction application 162 stops the reproduction of the moving picture. Namely, the reproduction application 162 stops transmission of the moving picture to the driver 166.

[5] Operation of the Moving Picture Reproduction Apparatus

Figure 7:
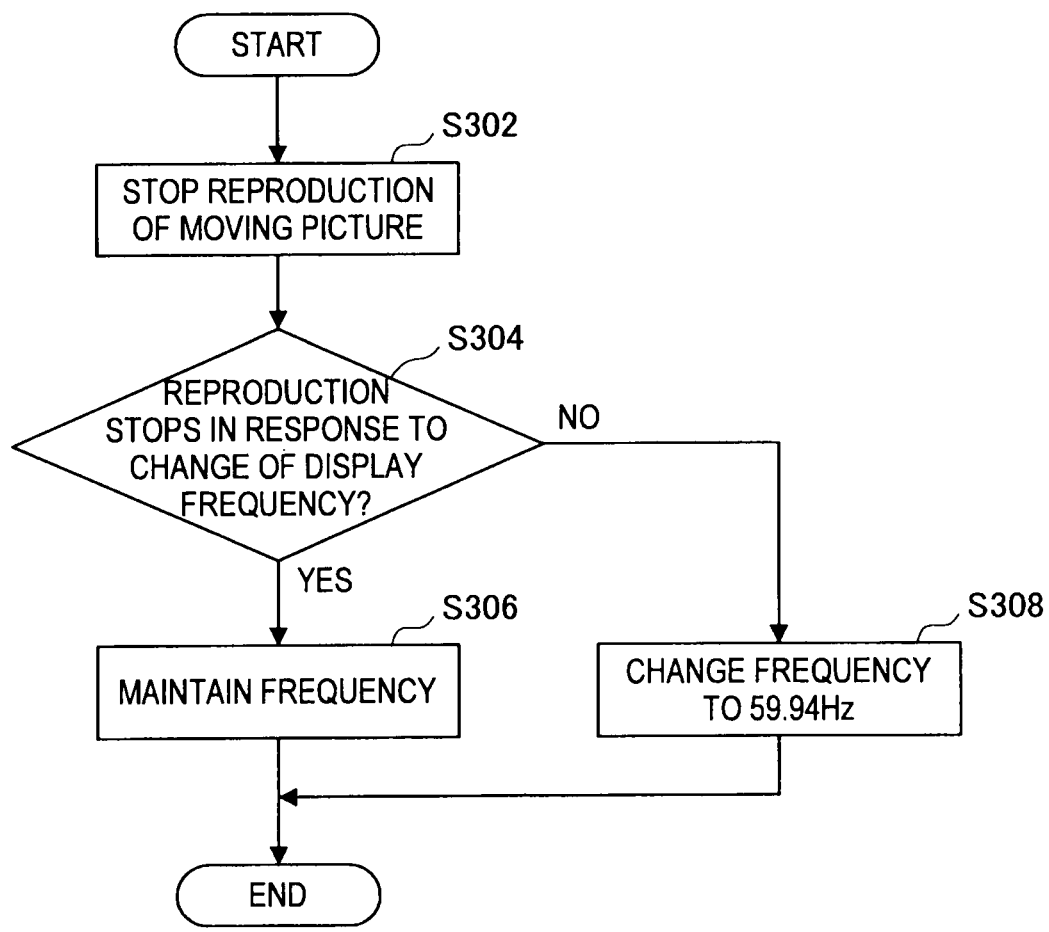
FIG. 7 is a flowchart illustrating a moving picture reproduction method in the moving picture reproduction apparatus according to the present embodiment.

The flow of data in the moving picture reproduction apparatus 100 has been hereinabove described. Next, the moving picture reproduction method of the moving picture reproduction apparatus 100 will be described with reference to FIG. 7. As illustrated in FIG. 7, the reproduction unit 152 stops the reproduction of the moving picture (S302).

A determination is made as to whether the reproduction of the moving picture has stopped in response to the change of the display frequency in step S302 (S304). Whether or not the reproduction of the moving picture has stopped in response to the change of the display frequency is determined in step S304, for example, in a manner as described below.

A determination is made as to whether the reproduction unit 152 starts the reproduction of the moving picture after the predetermined period of time passes since the reproduction unit 152 stops the reproduction of the moving picture. Further, a determination is made as to whether the reproduction unit 152 stops the reproduction of the moving picture after the predetermined period of time passes since the frequency change unit 154 changes the display frequency to the frequency of the moving picture.

In a case where the reproduction unit 152 starts the reproduction of the moving picture after the predetermined period of time passes since the reproduction unit 152 stops the reproduction of the moving picture, the reproduction of the moving picture can be deemed to have stopped in response to the change of the display frequency. In a case where the reproduction unit 152 stops the reproduction of the moving picture after the predetermined period of time passes since the frequency change unit 154 changes the display frequency to the frequency of the moving picture, the reproduction of the moving picture can be deemed to have stopped in response to the change of the display frequency.

In a case where the reproduction of the moving picture is determined to have stopped in response to the change of the display frequency in step S304, the frequency is maintained (S306). In a case where the reproduction of the moving picture is determined to have stopped not in response to the change of the display frequency in step S304, the frequency is changed to the display frequency prior to the reproduction of the moving picture (for example 59.94 Hz) (S308). The moving picture reproduction method of the moving picture reproduction apparatus 100 has been hereinabove described.

The moving picture reproduction apparatus 100 according to the present embodiment changes the display frequency to the frequency of the moving picture when the reproduction of the moving picture starts, and changes the display frequency to the frequency prior to the start of the reproduction of the moving picture when the reproduction of the moving picture stops. In a case where the display frequency is changed, the reproduction of the moving picture stops. In a case where the reproduction of the moving picture stops in response to the change of the display frequency, the display frequency is maintained at the frequency of the moving picture.

Therefore, the moving picture can be normally reproduced using the reproduction application that instructs to stop the reproduction of the moving picture when the frequency of the display is changed during the reproduction of the moving picture. Namely, when the moving picture is reproduced using the reproduction application that instructs to stop the reproduction of the moving picture, the repetition of the following operations can be avoided: the moving picture stops when the frequency is changed to match the frequency of the moving picture; and the frequency prior to the reproduction of the moving picture is changed when the moving picture stops.

The present application contains subject matter related to that disclosed in Japanese Priority Patent Application JP 2008-221854 filed in the Japan Patent Office on JP Aug. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A moving picture reproduction apparatus comprising:
   a frequency change unit that changes a display frequency of a display screen to a frequency of a moving picture upon determination that a reproduction of the moving picture starts; and
   a reproduction unit for stopping the reproduction of the moving picture upon determination that the frequency change unit changes the display frequency of the display screen,
   wherein the frequency change unit maintains the display frequency of the display screen at the frequency of the moving picture upon determination that the reproduction unit stops the reproduction of the moving picture in response to the change of the display frequency of the display screen by the frequency change unit, and changes the display frequency of the display screen to a frequency prior to the start of the reproduction of the moving picture upon determination that reproduction of the moving picture has completed.

2. The moving picture reproduction apparatus according to claim 1, wherein the frequency change unit maintains the display frequency of the display screen at the frequency of the moving picture upon determination that the reproduction unit starts the reproduction of the moving picture after a predetermined period of time passes since the reproduction unit stops the reproduction of the moving picture.

3. The moving picture reproduction apparatus according to claim 1, wherein the frequency change unit maintains the display frequency of the display screen at the frequency of the moving picture upon determination that the reproduction unit stops the reproduction of the moving picture after a predetermined period of time passes since the frequency change unit changes the display frequency of the display screen to the frequency of the moving picture.

4. The moving picture reproduction apparatus according to claim 1, wherein the reproduction unit stops the reproduction of the moving picture upon determination that the display frequency of the display screen is changed during the reproduction of the moving picture.

5. A moving picture reproduction method comprising the steps of:
   stopping a reproduction of a moving picture upon determination that a display frequency of a display screen is changed;
   determining whether the reproduction of the moving picture stops in response to a change of the display frequency of the display screen;
   maintaining the display frequency of the display screen at a frequency of the moving picture upon determination that the reproduction of the moving picture stops in response to the change of the display frequency; and
   changing the display frequency of the display screen to a frequency prior to the start of the reproduction of the moving picture upon determination that reproduction of the moving picture has completed.

6. A non-transitory computer readable storage medium including instructions stored therein, which when executed by a processor in a moving picture reproduction apparatus causes the processor to instruct:
   a frequency change unit to change a display frequency of a display screen to a frequency of a moving picture upon determination that a reproduction of the moving picture starts; and
   a reproduction unit to stop the reproduction of the moving picture upon determination that the frequency change unit changes the display frequency of the display screen, wherein
   the frequency change unit maintains the display frequency of the display screen at the frequency of the moving picture upon determination that the reproduction unit stops the reproduction of the moving picture in response to the change of the display frequency of the display screen by the frequency change unit, and changes the display frequency of the display screen to a frequency prior to the start of the reproduction of the moving picture upon determination that reproduction of the moving picture has completed.

* * * * *